(12) United States Patent
Kaz et al.

(10) Patent No.: US 6,177,029 B1
(45) Date of Patent: Jan. 23, 2001

(54) PHOTOSTORAGE AND EMISSIVE MATERIAL WHICH PROVIDES COLOR OPTIONS

(75) Inventors: Douglas V Kaz; Komei L Shibata, both of Santa Ana, CA (US)

(73) Assignee: Hirotec, Inc., Santa Ana, CA (US)

( * ) Notice: Under 35 U.S.C. 154(b), the term of this patent shall be extended for 0 days.

(21) Appl. No.: 09/166,199

(22) Filed: Oct. 5, 1998

(51) Int. Cl.[7] ............................. C09K 11/06; C09K 11/08
(52) U.S. Cl. ........................................................ 252/301.33
(58) Field of Search ........................................... 252/301.33

(56) References Cited

U.S. PATENT DOCUMENTS

| | | | |
|---|---|---|---|
| 5,376,303 | 12/1994 | Boyce et al. | 252/301.4 R |
| 5,839,718 | * 11/1998 | Hase et al. | 252/301.33 |
| 5,885,483 | * 3/1999 | Hao et al. | 252/301.4 R |

FOREIGN PATENT DOCUMENTS 60-170194 * 9/1985 (JP) ................................. 242/301.33

* cited by examiner

Primary Examiner—C. Melissa Koslow
(74) Attorney, Agent, or Firm—Koda & Androlia

(57) ABSTRACT

A photostorage and emission material with technology for altering color and methods of manufacturing same. The component is composed of at least one luminescent material and at least one fluorescent colorant and/or optical brightener component. The luminescent component absorbs energy from a light source and continues to re-emits the light energy in or first wavelength spectrum when the light source is removed. This energy excites another component including a fluorescent colorant and/or optical brightener material which is excited by absorbing light at the first wavelength spectrum and re-radiating the absorbed light at a second wavelength spectrum. The optical properties of each material are closely matched so that the emission spectrum of luminescent materials stimulate the excitation spectrum of the fluorescent and/or optical brightener materials. Practical applications include uses in plastic components, liquid resins, paints, printing inks, powder coatings for metals, fabric dyes, ceramic glazes, pad printing inks, decals, hot stamp decoration of plastic and powder coating.

20 Claims, 4 Drawing Sheets

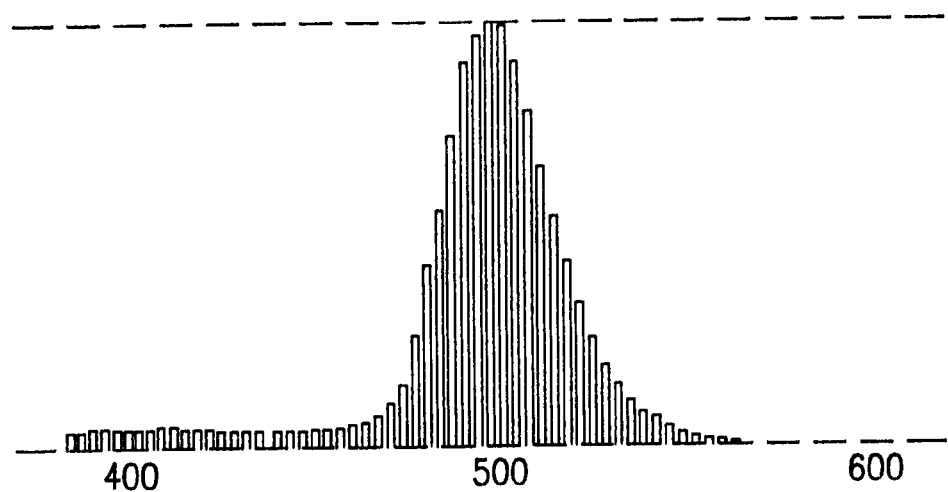
FIG. IA
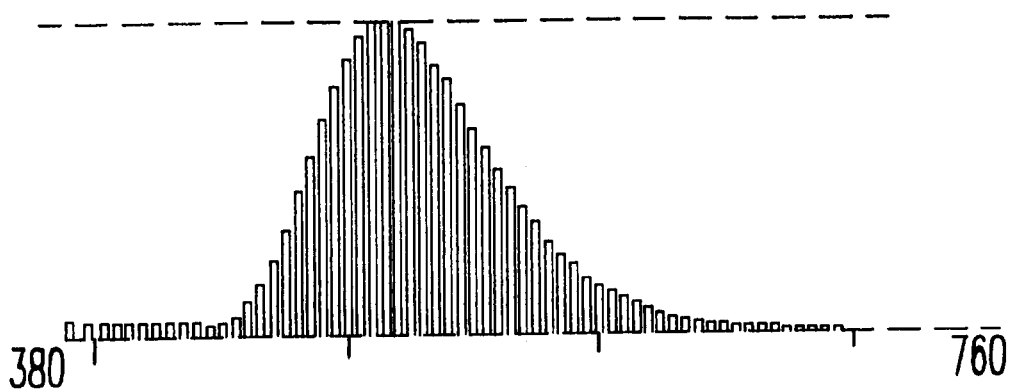
FIG. IB

PHOTOSTORAGE AND EMISSIVE MATERIAL WHICH PROVIDES COLOR OPTIONS

BACKGROUND OF THE INVENTION

1. Field of the Invention

This invention relates to photostorage and emissive materials, and particularly colored photostorage materials which have a long emission decay time and achieve a balance between daytime brightness and night time glow in the dark characteristics.

2. Prior Art

Photostorage materials absorb energy from sunlight, fluorescent light and other light sources that excite the material and convert that energy into visible light rays and other radiation. Photostorage materials continue to re-emit light and other radiation even after excitation ceases and is capable of repeating this process over a prolonged period of time.

One common photostorage material which exists in the prior art comprises copper activated zinc sulfide, such as ZnS:Cu. Such a material is frequently used in such products as watches, clocks and safety signs. In these types of photostorage materials, the zinc sulfide absorbs energy from ultraviolet rays and is activated sequentially.

However, copper activated zinc sulfide has a disadvantage in that its brightness decreases very rapidly and it deteriorates when exposed to ultraviolet radiation in the atmosphere. In particular, when copper activated zinc sulfide is used in watch dials, it only provides visible brightness for 20 to 30 minutes and cannot be used or exposed for long periods of time to the sun. In addition, the copper activated zinc sulfide generally has the appearance of a light yellow-green color in day light and is not very aesthetically pleasing.

Another method of providing glow in the dark properties is to use a radioactive substance such as promethium. Promethium will emit light for long periods of time, but has other disadvantages. In particular, promethium as a radioactive material is harmful to the human body and requires costly handling procedures. Associated costs include licensing to possess and distribute this hazardous material as well as waste disposal problems.

Recently, photostorage materials activated by normal light energy and having a long decay time have been developed. An example of such a material is shown in Chinese Patent Application Publication Number CN10537807A. The long decay photostorage material of this Chinese patent can be represented by the formula:

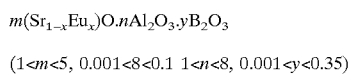

$(1<m<5, 0.001<δ<0.1\ 1<n<8, 0.001<y<0.35)$

The above Chinese photostorage material utilizes aluminum oxide, strontium oxide, boron oxide and europium oxide.

Other photostorage materials with long decay times are documented in U.S. Pat. No. 5,376,303, Japanese Patent Application Publication Number 96-170076 and Japanese Patent Application Publication Number 96-127772. While the preceding photostorage materials provide a long decay time such as 10 hours, they each have the disadvantage that they are low in initial brightness.

To overcome the disadvantages of these prior art long decay time photostorage materials, a long decay time material having initial high brightness was developed by Chemitec in under the trademark Picariko™ in Japan and PERMAGLOW® the United States. This photostorage material is in two types identified as CP-05 which glows green, and CP-10 which glows blue.

PERMAGLOW® is a synthetic super luminescent crystal composed of aluminum oxide, strontium oxide, calcium oxide, europium oxide and boron oxide. The methods of manufacturing synthetic crystals with photostorage properties and practical applications for PERMAGLOW® are described in U.S. patent application Ser. No. 08/703,152, now U.S. Pat. No. 5,885,483.

This unique luminescent material accumulates light for high initial brightness and long afterglow duration. It absorbs light from the sun, fluorescent lights, and other light sources that excite it and glows for up to 10 hours.

PERMAGLOW® was previously available in only two colors that glow in the dark; green glow and blue glow. Both have a light yellow green in day light conditions. When compared to the prior art, PERMAGLOW® provides superior performance including:

higher initial brightness up to 10 hours luminescence from each exposure to light excellent resistance to environmental conditions, including sunlight superior chemical resistance long product life of 10 years While PERMAGLOW® overcomes a significant number of problems of the prior photostorage materials, this luminescent material has its own disadvantages. In particular, both PERMAGLOW CP-05 and CP-10 appear light yellow-green in daylight conditions and are not very aesthetically pleasing in daylight. Also, when exhibiting glow in the dark characteristics, only the two colors, namely green and blue, are available from the PERMAGLOW CP-05 and CP-10.

SUMMARY OF THE INVENTION

Accordingly, it is a general object of the present invention to overcome the deficiencies and disadvantages of the prior art. In particular, it is an object of the present invention to provide a photostorage and emissive material having a broad range of color options.

Another object of the present invention is to provide a photostorage and emissive material with improved glow in the dark emissive properties featuring high initial brightness and prolonged decay time while still providing a broad range of colors.

A third object of the present invention to provide a photostorage and emissive material having daytime brightness and night time glow in the dark properties with a wide range of colors.

The above objects of the present invention are accomplished by a unique and new photostorage and emission material. The composite material is composed of a luminescent component which absorbs light or energy from a light source and re-emits the light or energy in the first wavelength spectrum when the light source is removed. This light energy excites another component of fluorescent colorant and/or optical brightener materials which are excited by absorbing light at a first wavelength spectrum and re-radiating the absorbed light at a second wavelength spectrum.

In practice, the preferred wavelength spectrum to excite the luminescent material are ultraviolet light and visible light in the blue and violet spectrum. The preferred first wavelength spectrum to excite the fluorescent colorant and/or optical brightener is ultraviolet light. The luminescent material generally re-emits light energy in the visible spectrum and the ultraviolet spectrum to excite a fluorescent colorant material and/or optical brightener which also radiates visible light.

In addition, at least one and/or two or more different fluorescent colorant and/or optical brightener materials could be combined with the luminescent material in order to create a wide range of photostorage and emissive materials of different colors. This allows those skilled in this technology to create custom colors for manufacturers of products which provide a unique glow color appearance for improved product recognition and marketability.

BRIEF DESCRIPTION OF THE DRAWINGS

FIGS 1A and 1B are respectively the emission spectrums of PERMAGLOW CP-05 and CP-10 luminescent materials.

DETAILED DESCRIPTION OF THE INVENTION

Luminescent Components

Figure 2A:
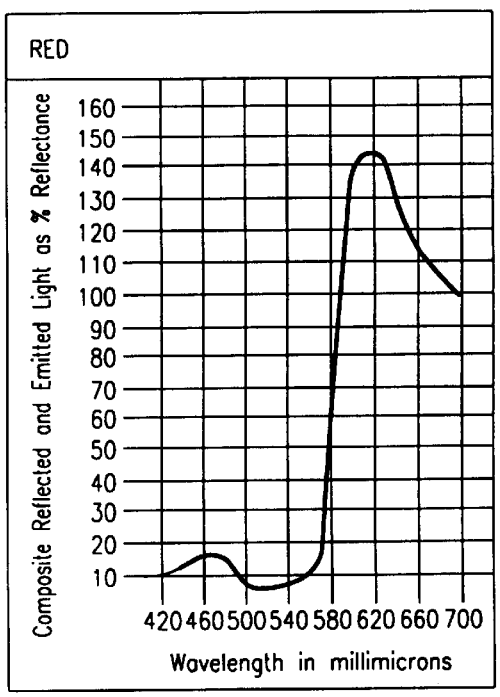
FIGS. 2A through 2J are the excitation spectrums of a plurality of fluorescent colorant materials which could be combined with the luminescent material.

Luminescent materials which exhibit glow in the dark characteristics absorb energy from sunlight, fluorescent lights, incandescent lights and other light sources. This absorbed energy excites the luminescent material and the luminescent material then converts or te-emits the energy in the visible light spectrum.

Luminescent materials continue to re-emit the visible light even after excitation ceases and are capable of repeating this process over and over again for a long period of time. In addition to emitting visible light rays, many luminescent materials also emit ultraviolet light. However, the ultraviolet light emitted by the luminescent materials is essentially invisible to the human eye and to date have been of very little use.

Fluorescent and Optical Brightener Components

Fluorescent colorants are those materials which receive energy at a broad light spectrum and convert it into visible light within a particular color spectrum. Optical brighteners also receive energy at a wide light spectrum and convert it into visible light which appears white.

Fluorescence is a process of photo-luminescence by which light of short wavelengths, either in the ultraviolet or the visible regions of the electromagnetic spectrum, is absorbed and reradiated at longer wavelengths. The re-emission occurs within the visible region of the spectrum and consequently is manifested as color. However, as soon as the excitation energy is removed, the visible light emitted by the fluorescent colorant and/or optical brightener material ceases.

Some substances have the property of exhibiting fluorescence by responding only to ultraviolet radiation. Many compounds belong to this category. These substances, under intense ultraviolet excitation, will produce vivid colors in the visible spectrum. The fluorescent effect, however, is negligible when the excitation is switched from the ultraviolet to the visible spectrum in the form of artificial or daylight illumination. These substances are said to exhibit "Ultraviolet Fluorescence."

Other substances will exhibit a strong fluorescent effect either under ultraviolet or daylight illumination, or the combination of both, and will appear intensely colored under such excitation. These substances are said to exhibit "Daylight Fluorescence." The duration of the fluorescent afterglow is of the order of $10^{-5}$ seconds, so, for all practical purposes, the duration of the fluorescent effect is instantaneous. As soon as the excitation ceases, the fluorescence disappears.

For the purpose of illustration let us consider an observer who perceives a red surface under daylight illumination. We will assume the daylight to be composed of all the wavelengths in the visible spectrum starting from blue up to red with a negligible amount of ultraviolet. Let us then analyze the sequence of events responsible for the manifestation of color.

A flux of energy in the form of blue, green, yellow up to red light will strike the red surface. If the surface is non-fluorescent, most of the energy received will be absorbed and generally dissipated in the form of heat, with the exception of the red component which will bounce back in the form of reflection. The amount of the reflected red will be dependent upon the efficiency of the colored surface and always less than the red contained in the source of excitation.

Figure 2C:
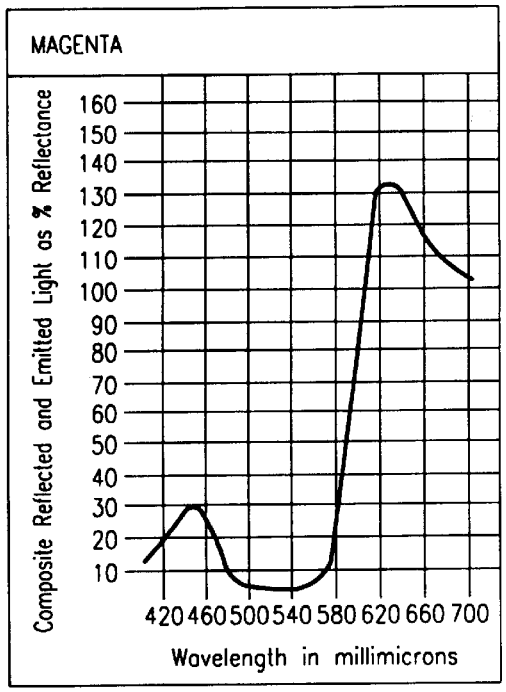
Figure 2B:
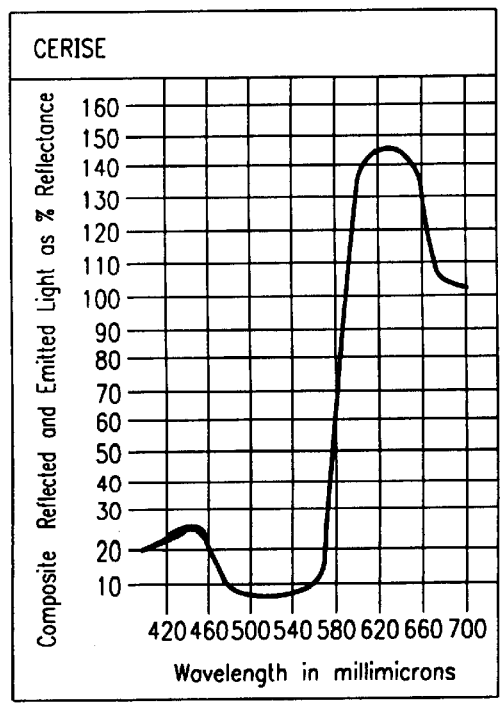
Figure 2D:
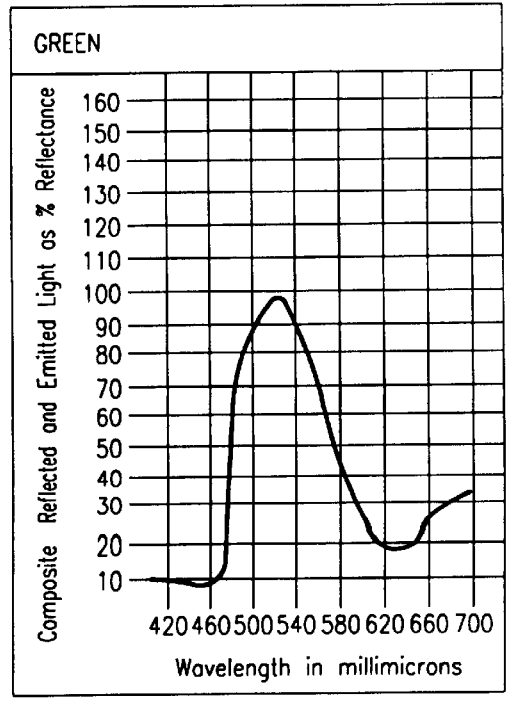
Figure 2E:
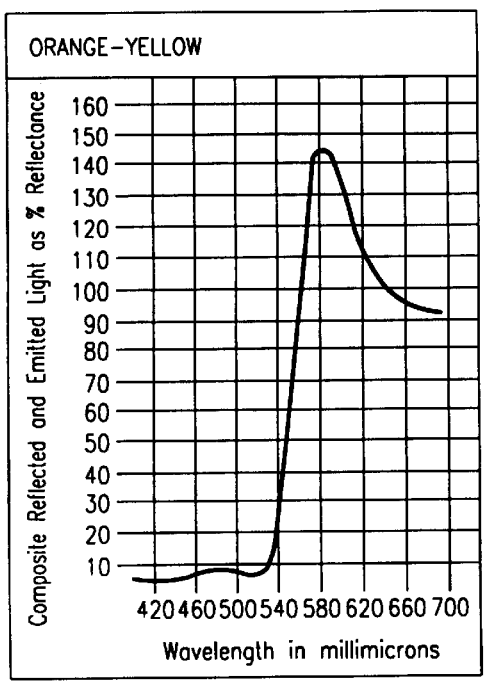
Figure 2G:
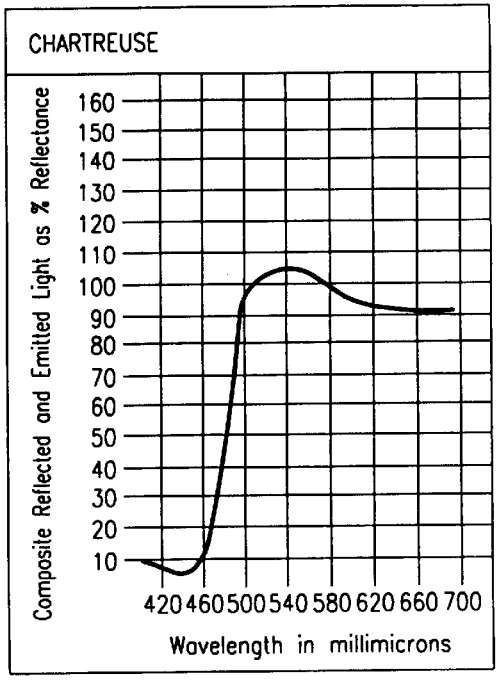
Figure 2F:
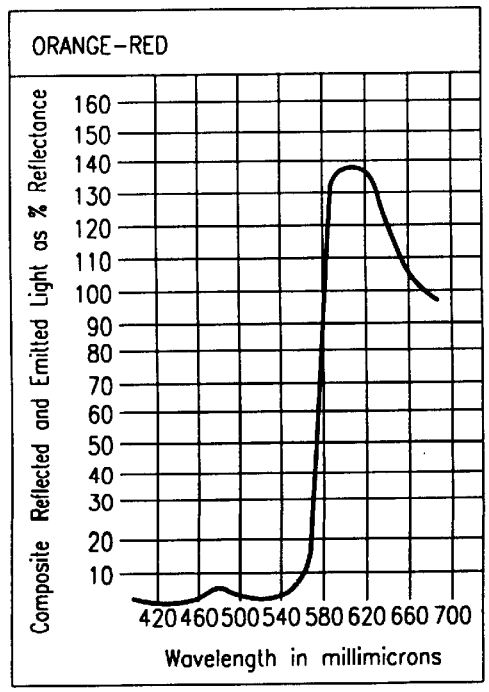
Figure 2H:
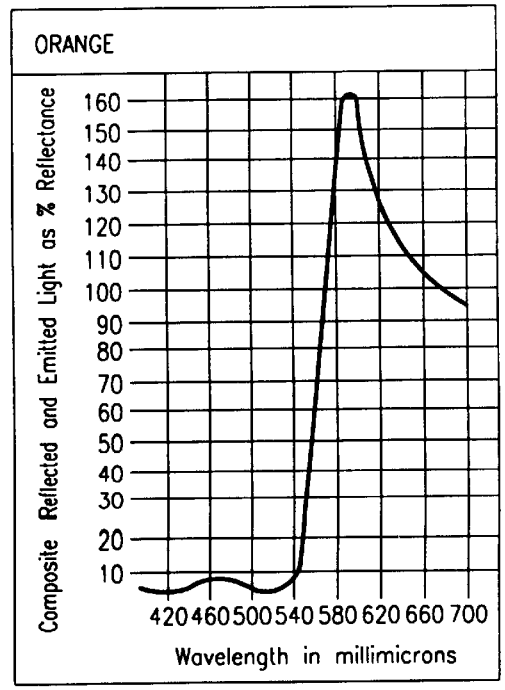
Figure 2I:
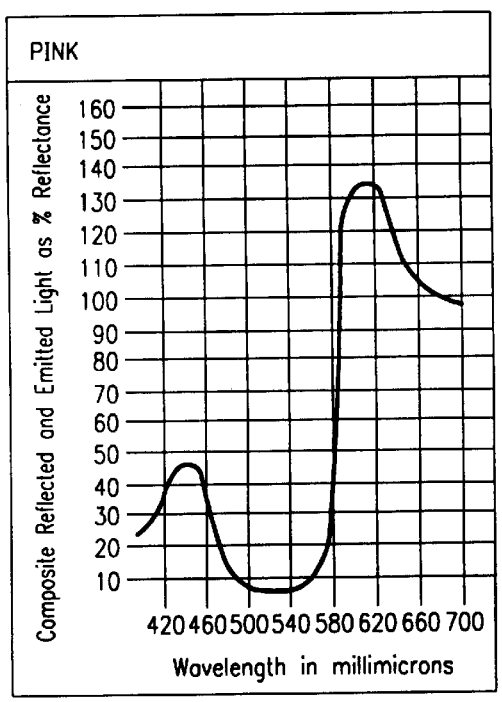
Figure 2J:
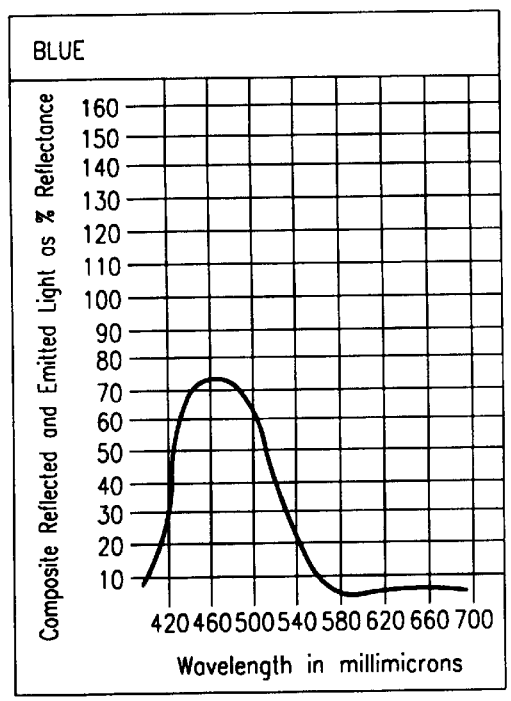

If the surface exhibits daylight fluorescence, the color is a composite of reflected red plus re-emitted red obtained by virtue of fluorescence. The re-emitted red from fluorescence results from the partial conversion of the short wavelengths of the visible spectrum such as blue and green, so that the total reflected and re-emitted light reaching the eye has an intense red coloration of exceptional brilliance. In essence, this red daylight fluorescent surface has acted as a powerful source of monochromatic light. Refer to the comparative chart of conventional color and fluorescent color in FIGS. 2A through 2J.

Another material which exhibits similar characteristics as fluorescent materials are optical brighteners. These optical brighteners have an excitation spectrum similar to that of fluorescent materials shown in FIGS. 2A through 2J and typically are white.

Methods of Formulation

When looking at luminescent materials, and particularly luminescent materials such as PERMAGLOW® CP-05 and CP-10, they re-emit the stored energy for relatively long periods of time, namely from 3 to 10 hours. However, luminescent materials have had a problem or disadvantage of appearing as a light yellowish color in daylight conditions and therefore are not very aesthetically pleasing for use in products which have a significant daytime exposure.

Fluorescent colorant with or without optical brighteners, however, are available in a number of bright colors or white from optical brightener alone, which are pleasing to the eye and thus improve the aesthetic appearance. However, fluorescent and/or optical brightener materials have the disadvantage that they cease to re-emit the visible light as soon as the excitation energy is removed.

Accordingly, it has been discovered that a photostorage material having the best properties of luminescent materials and fluorescent/optical brightener materials can be created out of a combination of the two. In particular, when one looks at FIGS. 1A and 1B which are the emission spectrums of the luminescent material PERMAGLOW® CP-05 and CP-10, it is apparent that the emission spectrum for the PERMAGLOW® luminescent material is generally in the range of 360 to 760 nanometers with the peak at around 500 nanometers. The wavelength spectrum for ultraviolet rays is in the range of 40–400 nanometers.

Clearly, by comparing these two wavelength spectrums, it is evident that the PERMAGLOW® luminescent material re-emits significant energy in the ultraviolet band. Accordingly, if the PERMAGLOW® luminescent material or some other luminescent material is combined with a fluorescent/optical brightener colorant material thah has an ultraviolet excitation spectrum which overlaps the emission spectrum of the luminescent materials, the two materials can be combined in such a manner that the luminescent material stimulates the fluorescent colorant and/or optical brightener component.

In this way each component enhances the other, and the advantages of each are combined to produce a photostorage component material which not only looks aesthetically pleasing in daylight, but also emits a similar aesthetically pleasing glow color for a long period of time after the excitation or light source has been removed.

By looking at the various fluorescent colorant and optical brightener materials available, it has been determined that many of these materials have an excitation spectrum which overlaps the emission spectrum of luminescent materials, and particularly PERMAGLOW CP-05 and CP-10. Examples of the excitation spectrums of suitable fluorescent materials are shown in FIGS. 2A through 2J attached hereto. Optical brighteners with similar excitation spectrums can also be utilized, to achieve the desired results as described above.

An example of fluorescent colorant materials are microsphere pigments manufactured by Radiant and various fluorescent colorants from Day Glo color. An example of an optical brightener material is DX9-0682 manufactured by Phoenix Color & Compounding Inc. Upon determining the existence of fluorescent colorant and optical brightener materials with an excitation spectrum which overlaps the emission spectrum of the luminescent materials, one or more fluorescent colorants and/or optical brightener colorants can be combined together with one or more of the luminescent materials will produce photostorage material which is bright in color in daylight and will glow a similar color in the dark for an extended period of time.

In practice, a preferred optical brightener for the emissive material is one that appears white in color for maximum versatility in color formulation. In some uses, a liquid fluorescent dye may be used as the emissive material.

In use, the photostorage material is generally provided as a powder with a particle size between 1 to 50 microns depending on the use. In general, the larger the crystal size, the brighter the glow and if the particle size becomes less than one micron, the light emission is poor. The present invention can also be processed into pellet concentrates which are preferred for processing plastics by injection molding, blow molding and extrusion methods including: profile, film, fiber, wire and cable.

The base materials which the photostorage material of the present invention can be added to as a colorant includes materials which are clear or translucent. These include, but are not limited to: plastic pellets, liquid plastic resins, printing inks, paints, dyes, and powder coatings for metals. Typically, in any material to which the photostorage material of the present invention is to be added as a colorant, the luminescent material will represent 6% to 50% and the fluorescent material will represent 0.1% to 4% by weight of the total formulation.

Still further, when making a glow in the dark product utilizing the photostorage material of the present invention as a colorant, one must consider certain requirements as follows:

1. optimum luminescence is achieved by selecting base materials which are clear or transparent;
2. the fluorescent colorants to be added to the luminescent material should be selected to be those which are not too dark in color and which are complimentary and comprise prerefably transparent fluorescent colors for high daytime brightness;
3. the brightness and duration of the glow-in-the-dark is affected by the loading of the composite photostorage and emissive material of the present invention within the base material, i.e., the higher the loading, the brighter the glow; and
4. the brightness and duration of the glow is affected by the thickness of the product or coating on the product and in general, the thicker the product or coating layer, the brighter the glow with longer duration.

It should be further apparent that the photostorage material of the present invention could also be coated onto other materials in order to provide security or safety. Examples including coatings are or applied to the dials or faces of wrist watches and clocks in order to make them more readable in the dark. Consumer products can be molded, extruded or cast in plastics with the present invention to provide marketable features of safety, brand name recognition and design performance. Practical applications also include uses in paints, printing inks, powder coating for metals, fabric dyes, ceramic glazes, pad printing inks, decals and hot stamp decorating of plastics.

It should also be apparent that while the present invention has been described in terms of the combination of one or more luminescent materials and one or more fluorescent colorants and or optical brightener materials, the preferred luminescent material with the brightness initial glow and longest glow time is the PERMAGLOW® CP-05 and CP-10 luminescent material. However, other luminescent materials with longer glow time and brighter initial brightness may be utilized in the photostorage material of the present invention as they are developed.

Also, it should be apparent to those skilled in this technology that luminescent materials which do not emit visible light and which only emit radiation in an excitation band for a particular one or more fluorescent or optical brightener materials could also be used in the present invention without departing from the spirit or scope of the invention.

What is claimed is:

1. A photostorage and emission material composed of a luminescent material which absorbs light energy from a light source and re-emits the light energy in a first wavelength spectrum when the light source is removed; and a material selected from the group consisting of fluorescent colorant and optical brighteners which are excited by absorbing light at said first wavelength spectrum and re-radiating the absorbed light at a second wavelength spectrum.

2. A photostorage and emission material comprising a luminescent material which absorbs energy from a light source and re-emits the energy in a first wavelength spectrum when the light source is removed; and a material selected from the group consisting of two or more fluorescent colorant and/or optical brightener materials which are excited by absorbing light at said first wavelength spectrum and re-radiating the absorbed light at said second wavelength spectrum.

3. A photostorage and emission material comprising two or more luminescent materials which absorb energy from a light source and re-emit the energy in a first wavelength spectrum when the light source is removed; and a material selected from the group consisting of fluorescent colorant and optical brighteners which are excited by absorbing light at said first wavelength spectrum and re-radiating the absorbed light at said second wavelength spectrum.

4. A photostorage and emission material comprising two or more luminescent materials which absorb energy from a light source and re-emit the energy in a first wavelength spectrum when the light source is removed; and a material selected from the group consisting of two or more fluorescent colorant and/or optical brightener materials which are excited by absorbing light at said first wavelength spectrum and re-radiating the absorbed light at a second wavelength spectrum.

5. A photostorage and emission material according to claim 1 wherein the first wavelength spectrum is shorter than said second wavelength spectrum.

6. A photostorage and emission material according to claim 1 wherein said luminescent material comprises a sinter expressed by a general formula $MO.(n-x)\{aAl_2O_3^{\alpha}+(1-a)Al_2O_3\}.B_2O_3$: R, where M represents an alkaline earth metal, R represents a rare earth element, $0.5 < a \leq 0.99$, $0.001 \leq x \leq 0.35$, and $1 \leq n \leq 8$, and a part of M may be replaced with at least one alkaline earth metal selected from Mg, Ca and Ba.

7. A photostorage and emission material comprising: a colorant material which is excited by absorbing light at a first wavelength spectrum and re-radiates said absorbed light at a second wavelength spectrum; and a light storage material which absorbs light energy from a light source and re-emits said light energy at at least said first wavelength spectrum when said light source is removed to excite said colorant material.

8. A photostorage and emission material comprising: two or more colorant materials which are excited by absorbing light at a first wavelength spectrum and re-radiate said absorbed light at a second wavelength spectrum; and a light storage material which absorbs energy from a light source and re-emits said light energy at at least said first wavelength spectrum when said light source is removed to excite said colorant material.

9. A photostorage and emission material comprising: a colorant material which is excited by absorbing light at a first wavelength spectrum and re-radiates said absorbed light at a second wavelength spectrum; and two or more light storage materials which absorb energy from a light source and re-emit said energy at at least said first wavelength spectrum when said light source is removed to excite said colorant material.

10. A photostorage and emission material comprising: two or more colorant materials which are excited by absorbing light at a first wavelength spectrum and re-radiate said absorbed light at a second wavelength spectrum; and two or more light storage materials which absorb energy from a light source and re-emit said energy at at least said first wavelength spectrum when said light source is removed to excite said colorant material.

11. A photostorage and emission material according to claim 7 wherein the first wavelength spectrum is shorter than said second wavelength spectrum.

12. A photostorage and emission material according to claim 7, wherein said light storage material comprises a sinter expressed by a general formula $MO.(n-x)\{aAl_2O_3^{\alpha}+(1 \times a)Al_2O_3\}.B_2O_3$: R, where M represents an alkalin earth metal, R represents a rare earth element, $0.5 < a \leq 0.99$, $0.001 \leq x \leq 0.35$, and $1 \leq n \leq 8$, and a part of M may be replaced with at least one alkaline earth metal selected from Mg, Ca and Ba.

13. A photostorage and emission material according to claim 7, wherein said colorant material is selected from the group consisting of fluorescent materials and optical brightener materials.

14. A method of making a photostorage and emission material comprising:

selecting at least one colorant material which is excited by absorbing light at a first wavelength spectrum and re-radiates said absorbed light at a second wavelength spectrum, wherein said first wavelength spectrum is shorter than said second wavelength spectrum;

selecting a light storage material which absorbs light energy from a light source at said second wavelength spectrum and re-emits said light energy at least said first wavelength spectrum when said light source is removed; and mixing together said colorant material and said light storage material.

15. A method of making a photostorage and emission material comprising:

selecting at least two colorant materials which are excited by absorbing light at a first wavelength spectrum and re-radiate said absorbed light at a second wavelength spectrum;

selecting a light storage material which absorbs light energy from a light source and re-emits said energy at said first wavelength spectrum when said light source is removed; and mixing together said at least two colorant materials and said light storage material.

16. A photostorage and emission material according to claim 1, wherein the first wavelength spectrum includes both ultraviolet and visible light and said second wavelength spectrum includes visible light.

17. A photostorage and emission material according to claim 7, wherein the first wavelength spectrum is that of ultraviolet light and said second wavelength spectrum includes visible light.

18. A photostorage and emission material comprising a light storage material which absorbs energy from a light source and continues to re-emit light energy in the first emission wavelength spectrum when the light source is removed, which excites another component consisting of two or more colorant materials that continues to re-radiate the absorbed light at a second emission wavelength spectrum.

19. A photostorage and emission material comprising two or more light storage materials which absorbs energy from a light source and continues to re-emit light energy in the first emission wavelength spectrum when the light source is removed, which excites another component consisting of a colorant material that continues to re-radiate the absorbed light at a second emission wavelength spectrum.

20. A photostorage and emission material comprising two or more light storage materials which absorbs energy from a light source and continues to re-emit light energy in the first emission wavelength spectrum when the light source is removed, which excites another component consisting of two or more colorant materials that continues to re-radiate the absorbed light at a second emission wavelength spectrum.

* * * * *